// United States Patent [15] 3,653,758
Trimmer et al. [45] Apr. 4, 1972

[54] PRESSURELESS NON-CONTACT ELECTROSTATIC PRINTING

[72] Inventors: Donald S. Trimmer; Walter B. Bienert, both of Baltimore, Md.

[73] Assignee: Frye Industries, Inc., New York, N.Y.

[22] Filed: July 10, 1970

[21] Appl. No.: 53,938

[52] U.S. Cl. ................................355/16, 117/93.4, 118/612, 118/621, 118/637, 355/17

[51] Int. Cl. ..................G03g 15/00, B05b 5/00, B05c 11/00

[58] Field of Search ...................355/8, 11, 16, 17; 117/93.4; 118/612, 621, 623, 637

[56] References Cited

UNITED STATES PATENTS

| | | | |
|---|---|---|---|
| 3,223,008 | 12/1965 | Hunstiger | 355/16 X |
| 3,397,628 | 8/1968 | Granzow et al. | 355/16 X |
| 3,502,408 | 3/1970 | Brodie | 355/16 |

*Primary Examiner*—Samuel S. Matthews
*Assistant Examiner*—Richard A. Wintercorn
*Attorney*—Robert E. Isner, Peter J. Franco and Spencer T. Smith

[57] ABSTRACT

A pre-determined, non-random electrostatic image is formed and developed on a thin, flexible plate about 0.0005 to about 0.050 inch thick. A substrate to be printed is positioned facing but spaced apart from this pre-formed image of particles, and an electrostatic field is established therebetween. The field is of insufficient strength to dislodge the image of particles from the thin plate, but of sufficient strength to transfer the image to the substrate once it is dislodged from said thin plate. The additional force required to dislodge the particles is supplied by imparting ultrasonic flexual shock waves to the thin plate. The dislodging effect of the shock waves is enhanced by exciting the vibratory system at a resonance frequency of said system. The electrostatic attraction between the image of particles and the thin plate serves to minimize any tendency for relative lateral movement of the particles upon application of the ultrasonic shock waves, thereby causing the particles to be propelled directly outward from the thin plate in their desired image configuration and permitting the reproduction of the image with superior clarity and sharpness on the spaced-apart substrate. By sweeping the driving frequency through a range including a resonance frequency of the vibratory system, several distinct resonances of the thin plate will be effected, thereby superimposing several nodal patterns on said thin plate so as to minimize variations in the particle intensity of the reproduced image and further enhancing the quality of said image. For continuous operations, the thin plate is conveniently employed in the form of a rotatably mounted continuous belt, with a cleaning station, a charging station, a development station, and an image transfer station positioned along the path of rotation. A metallic belt may be employed with a non-conductive image formed thereon by coating the plate with a light sensitive photo-resist material, exposing the coating to light through a negative of the desired image and developing the thus exposed image by dissolving the unexposed, non-image areas with an organic solvent. The flexual waves may be generated in the thin plate by a piezoelectric crystal system. When the thin plate is used in the form of a continuous belt, the piezoelectric crystal system may conveniently be affixed or otherwise connected to one of the belt-supporting rollers. The piezoelectric crystals may also be incorporated as an integral part of such a roller for greater convenience and control in continuous printing operations. Excitation of the crystal system can occur nearly instantaneously when the printing gap is less than about one-eighth inch. At about three-sixteenth inch or more, the amplitude of the excitation signal may be increased slowly, and the driving frequency may be swept slowly to limit the instantaneous toner current in the gap and avoid mutual repulsion of particles and some distortion of the reproduced image.

21 Claims, 4 Drawing Figures

INVENTORS
WALTER B. BIENERT
DONALD S. TRIMMER
BY

INVENTORS
WALTER B. BIENERT
DONALD S. TRIMMER
BY [signature]

PRESSURELESS NON-CONTACT ELECTROSTATIC PRINTING

BACKGROUND OF THE INVENTION

1. Field of the Invention

This invention relates to an improved electrostatic printing technique. More particularly, it relates to an improved method and apparatus for the pressureless, non-contact electrostatic printing of substrates.

2. Description of Prior Art

The electrostatic printing of substrates by pressureless, non-contact means is generally known in the art. Printing techniques have been proposed in which an offset, pre-formed image of charged particles is projected across an air gap from an image-supporting surface to the substrate being printed by means of an electrostatic field. The field is used to dislodge the particles from the image-forming surface and to effect the transfer of the particles across the air gap to the substrate. Such techniques, in which no direct physical contact between the image-forming plate and the surface to be printed is required, offers numerous advantages in the printing art. Because of the lack of contact between the plate and the substrate, suitable electrostatic printing presses may be made of appreciably lighter construction than would otherwise be required in conventional pressure contact printing. Not only would such lighter presses permit a significant reduction in capital cost, but the life of the press would also be greatly increased because of the reduced wear to which the press would be subjected in normal operations. In addition, the printing plate would not be subjected to the normal plate erosion that occurs on conventional printing plates due to high pressure contact with printing inks inherently possessing certain abrasive characteristics.

In addition, pressureless, non-contact electrostatic printing offers the possibility of greatly increased flexibility as compared with conventional pressure contact printing. This greater flexibility further enhances the economic desirability of employing non-contact electrostatic printing techniques in commercial operations.

The advantages of pressureless, non-contact electrostatic printing indicated above would apply with respect to the printing of flat surfaces, such as continuous sheets of paper or the flat surface of containers or other substrate surfaces upon which printing may be desired. In addition, non-contact electrostatic printing offers significant advantages with respect to the printing of three-dimensional objects and surfaces that are not flat. Such non-flat surfaces or substrates may be curved or of an irregular nature so as to make conventional pressure contact printing techniques unsuitable. Non-contact electrostatic printing, in which the image-forming particles are caused to migrate across an air gap by means of electrostatic forces, can readily be adapted to the printing of such irregular surfaces since the image-forming surface need not come into direct contact with the substrate being printed. It is highly desirable, of course, that such non-contact printing techniques be of the "offset" process type in which the image is pre-formed on a surface other than the substrate to be printed and is thereafter transferred to the substrate in an image transfer operation and of a type readily adaptable for continuous tone image and multi-color printing.

An early technique for the electrostatic transfer of an image of dielectric particles from an image-supporting surface to the substrate being printed by contact printing is disclosed in the Schaffert Patent, U.S. Pat. No. 2,576,047. The process disclosed therein is generally known in the art as xeroprinting. This process employs a xeroprinting plate that includes an electro-conductive base usually of metallic character, having an electrically insulating layer in the form of the image to be printed positioned on the image-forming surface thereof. This plate is electrically charged, as by means of a corona wire, while the electrically conductive base is grounded. The electrical charge is thus retained upon the surface of the electrically insulating image portion, while the charge on the electro-conductive base portion of the plate leaks off. Charged dielectric particles are then deposited on the thus-charged plate, with the particles having an electrical charge of a nature opposite to the charge on the electrically insulating layer on the surface of the plate. The charged dielectric particles will, therefore, be retained in the charged portions of the plate so as to develop the latent electrostatic image in the pre-determined, non-random image configuration desired. The particles may readily be removed from the electrically conductive portions of the plate where the electrical charges are insufficient to retain the particles on the surface of the plate.

After the charged dielectric particles have been pre-formed in the desired image configuration, they are brought into contact with and transferred to the substrate to be printed in the form desired to be printed thereon by means of an electrostatic field. After the particles have been transferred to the substrate, they can be fixed thereon by any one of the conventional techniques normally employed in the printing art for this purpose.

When the pre-formed image of particles is transferred across an air gap to the substrate being printed in a non-contact printing technique, the electrostatic field must often be of such a strength or intensity as to approach the breakdown strength of air. In the event irregularities exist on the image-supporting surface or on the package, box, article or other substrate to be printed so as to effectively reduce the air gap between the supporting surface and the substrate even in a localized area, arcing may occur. Such arcing, or field discharge, short-circuits the printing field, resulting in a disruption of the printing operation, possibly damaging both the printing plate and the substrate being printed, and risking the possibility of a disastrous fire or other injury to the system. The risk of such undesired arcing is greatly aggravated in printing operations that must operate at relatively high speeds, particularly in an automatic or semi-automatic manner. Variations in the air gap because of surface irregularities and the like increase the serious risk of destructive arcing or field discharge on such high-speed operations. This is especially true in light of the need for operating with a very small air gap between the pre-formed particles and the substrate in order to avoid excessively high field potentials.

Pressureless, non-contact printing techniques must often be avoided since the required electrostatic field intensity often approaches or exceeds the point at which the danger of such arcing is unacceptably great. One cause for the very high field intensities that such electrostatic printing processes require has been the tendency for the particles to adhere to one another and to the printing plate on which they are deposited, as noted in the Childress patent, U.S. Pat. No. 3,245,341. This patent discloses forming the desired image on one side of porous base material 10 by applying a mask 14 that closes off air passages in the non-printing areas. A vacuum is applied to the unmasked side of porous material 10 to draw powder particles onto the exposed surface of the porous material to form the desired image pattern. When the image is to be transferred to the substrate being printed, the vacuum is broken, and an electric field of suitable polarity is established by means of conductive backing plate 94 for transferring the particles to the substrate. At column 8, lines 64–73, Childress notes that the powder particles tend to adhere to the porous surface after the vacuum has been broken. In all of the embodiments illustrated in the drawings, Childress discloses bringing the image-bearing surface of material 10 into contact with the substrate. In this circumstance, of course, the problem of spark discharge across an air gap does not exist. Childress also discloses, however, that the substrate may be spaced apart from the image-bearing surface. In this event, the electrostatic field must be of sufficient strength not only to transfer particles across the printing gap to the substrate, but also to overcome the electrostatic attraction and mechanical adhesion forces tending to cause the particles to adhere to one another and to the porous base 10. It has been found that the electrostatic field intensities required are often sufficiently high as to approach or exceed the point at which arcing occurs in the printing gap, thereby deterring the use of the pressureless, non-contact embodiments of this electrostatic printing technique.

In an entirely different approach to pressureless, non-contact application of toner particles to a substrate, York, U.S. Pat. No. 3,140,199, discloses the forming of a latent, electrostatically charged image on the photo-conductive surface of xerographic sheet 10 by charging the surface and exposing it to light. Toner particles 24 held on moving belt 15 by triboelectric charges are transferred to the charged areas of image 10 by mechanical vibration or agitation of the belt at developing station. This mechanical agitation, which may be provided by the rapid vibrating of rollers 26, overcomes the tendency of the particles to adhere to belt 15 so that the field created by the imagewise charge on the photo-conductive surface may be effective in forming a developed image on said surface by the transfer of the toner particles from their random, non-image configuration on belt 15 to the charged areas of xerographic sheet 10. This technique, therefore, requires the use of a relatively expensive photo-conductive coating on the xerographic sheet to be printed and requires the charging of the coated sheet as well as the exposure of each said sheet to light in order to form the necessary electrostatic image thereon. In addition, the random distribution of the toner particles on the moving belt passing the developing station makes it difficult to effect the transfer of the toner particles only to the charged areas of the sheet so as to form the desired image free of unwanted background in the non-image areas of the sheet. In addition, York states in column 1, lines 38–44 that the mechanical agitation to which the "fairly stiff" belt 15 is subjected is such as to overcome any lack of uniformity of the toner particles on the belt, thus making this technique unacceptable for the transfer of a pre-determined non-random image from the moving belt to the sheet being printed.

It is an object of this invention, therefore, to provide an improved method and apparatus for pressureless, non-contact electrostatic printing.

It is another object of the invention to provide an improved process and apparatus for the pressureless, non-contact electrostatic printing of an offset, pre-formed image of superior quality on a spaced-apart substrate.

It is another object of the invention to provide a method and apparatus for non-contact electrostatic printing in which the risk of arcing may be substantially reduced.

It is another object of the present invention to provide a method and apparatus for contactless electrostatic printing in which the intensity of the electrostatic field employed may be minimized.

It is a further object of the present invention to provide a non-contact electrostatic printing technique in which the necessity for employing excessively high field-producing voltage between the image-forming surface and the substrate being printed can be avoided.

It is a further object of the invention to provide a non-contact electrostatic printing technique in which the necessity for employing extremely close spacing between the supporting surface and the substrate being printed can be avoided.

It is a still further object of the present invention to provide a pressureless, non-contact printing process and apparatus particularly suitable for the printing of irregular shaped substrates.

It is a further object of the invention to provide a method and apparatus for the pressureless, non-contact printing of three-dimensional objects.

It is a further object of the present invention to provide a non-contact electrostatic printing process and apparatus especially adapted to produce a continuous tone image and for multi-color printing.

It is a further object of the invention to provide a pressureless, non-contact electrostatic printing apparatus and process in which the risk of arcing is obviated while reproducing an image of superior quality on the image-receiving substrate.

With these and other objects that will appear from the following description, the invention is hereinafter set forth in detail, the novel features thereof being particularly printed out in the appended claims.

SUMMARY OF THE INVENTION

The intensity of the electrostatic field necessary to dislodge dielectric particles from their pre-determined, non-random position in pressureless, non-contact electrostatic printing techniques is minimized by pre-forming the image of particles on a thin flexible plate and subjecting the plate to flexual vibrations, or shock waves, in the ultrasonic range. The flexual waves are transmitted by the thin plate to the image of particles positioned thereon. This mechanical shock in the ultrasonic range assists the electrostatic field between the plate and the substrate being printed in overcoming the forces tending to cause the particles to adhere to their pre-formed position on the thin plate. The image of particles is thus dislodged from its pre-formed position under the combined action of the electrostatic field and the ultrasonic shock waves without blurring or otherwise impairing the clarity and sharpness of the pre-determined image. The intensity of the electrostatic field employed will be sufficient to effect the transfer or migration of the thus dislodged particles in their desired image configuration to the spaced-apart substrate being printed. In the absence of the ultrasonic flexual waves imparted to said thin plate, a much higher electrostatic field strength would be required to dislodge the particles from the thin plate for transfer to the substrate. At this higher field strength, a significant risk of undesired and potentially disastrous field discharge in the gap between the pre-formed image and the substrate is likely to exist, particularly in the printing of irregularly shaped objects.

The lower electrostatic field intensity required in the practice of the present invention makes possible the use of a greatly reduced field potential at any given spacing between the image-supporting plate and the substrate being printed. At any given field potential, in turn, the present invention permits a greater spacing between the plate and substrate than would heretofore be required. The flexibility thus provided greatly enhances the commercial attractiveness of the electrostatic printing operation, in addition to eliminating the risks that have heretofore prevented or tended to prevent its use in various commercial operations.

The flexual waves in the ultrasonic range imparted to the thin plate may be applied by an ultrasonic transducer, such as a piezoelectric crystal system, having a driving frequency in the range of from about 20 kHz. to about 100 kHz. The transducer system may be attached to one edge of the thin plate, or, when the thin plate is used in the form of a rotatably mounted continuous belt, the transducer may be affixed or connected to one of the belt support rollers serving to position the plate with the image in proper position facing but spaced apart from the substrate. In a desirable modification, the ultrasonic transducer can be incorporated as an integral part of the roller itself, providing greater convenience and control in high-speed operations utilizing a continuous belt of said thin plate material.

In such continuous belt operations, the plate is conveniently composed of a metallic material with an insulating image positioned thereon, as by the development of a light sensitive, photo-resist image on the metallic plate. The insulating image on the continuous belt is rotated past a charging station, a development station at which charged dielectric particles are preferentially retained on the charged, insulating image areas of the plate, an image transfer station at which the image of particles is transferred to the substrate to be printed, and a cleaning station at which residual particles are removed from the plate prior to the next printing cycle as rotation of the belt is continued. Superior results are obtained by employing a belt having a thickness of from about 0.0005 inch to about 0.015 inch.

The dislodging effect of the flexual ultrasonic shock waves imparted to the thin plate is enhanced by exciting the vibratory system at a resonance frequency of the system. The amplitude of the imparted shock waves is thereby enhanced, while the very low mass of the thin plate minimizes the dampening effect due to absorption of the imparted energy of the shock waves. Any tendency for relative lateral movement of the particles upon application of the ultrasonic shock waves is minimized by the electrostatic attraction existing between the image of particles and the thin plate as a result of the development of the pre-formed latent electrostatic image on the surface of the thin plate with dielectric particles of opposite polarity thereto. The image reproduced on the substrate will thereby have a clarity and sharpness of superior quality. To minimize variations in the particle intensity of the reproduced image, the driving frequency at which the vibratory system is excited can be swept through a range, e.g., about 2 to about 10 kHz., including a resonance frequency of the vibratory system. The thin plate of very low mass will thereby be subjected to ultrasonic shock waves at several resonance frequencies of the thin plate itself, thereby superimposing several nodal patterns on the plate. In this manner, an image of uniform intensity can be reproduced on the spaced-apart substrate, further enhancing the high-quality reproduction obtainable by the non-contact printing technique of the present invention.

BRIEF DESCRIPTION OF THE DRAWINGS

The invention is hereinafter described with reference to the accompanying drawings in which.

DETAILED DESCRIPTION OF THE INVENTION

Figure 1:
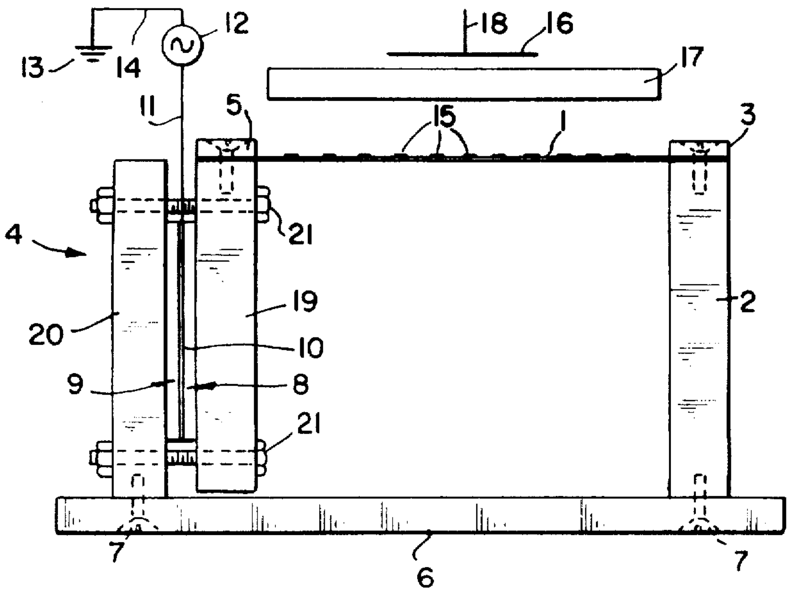
FIG. 1 is a side elevational, schematic illustration of one apparatus for securing and vibrating the thin plate of the present invention.

In the non-contact electrostatic printing technique herein described, the pre-formed image of charged dielectric particles is transferred from a thin printing plate to a spaced-apart substrate not only without risk of field discharge, but in a manner such as to enhance the uniformity, sharpness and clarity of the reproduced image. The thin plate will generally comprise a thin metallic sheet or foil adapted to carry the desired image of particles therein. By employing such a plate with little or essentially no mass, the plate may readily be adapted for cyclic printing operations as hereinafter set forth. Since the printing plate has little mass, the plate will have virtually no effect upon the resonance characteristic of the vibratory system used to impart ultrasonic shock waves to the printing plate. The amplitude of the imparted shock waves is thereby enhanced. In addition, the resonance characteristics of the low mass plate itself have been found such as to permit the overcoming of intensity modulation of the image transferred to the substrate, thereby resulting in more uniform image reproduction and enhancing the quality of the printing operation.

It has heretofore been proposed to transmit the energy output of a piezoelectric system through vibration-transmitting blocks to a pre-formed image of particles on the end portion of such a block as ultrasonic shock waves. Such systems will have distinct, spaced-apart resonance frequencies at which standing waves are created in the vibration-transmitting blocks. At such resonance frequencies of the vibratory system, the amplitude of the energy transmitted by a given piezoelectric crystal system to the end portion of the blocks will be maximized, and the dislodging effect of the ultrasonic shock waves on the pre-formed image of particles will thereby be enhanced. Such resonance conditions are so widely spaced, however, that in practice only a few, e.g., two or three, such resonances will be found to occur in the ultrasonic range. While ultrasonic flexual shock waves at such resonance conditions have been found particularly effective in dislodging the pre-formed particles, such flexual shock waves create a distinctive nodal pattern on the image-forming surface, the distance between adjacent nodes of minimum excitation being equal to one-half a wave length of the standing wave created in the block at resonance conditions. When such flexual shock waves are used to assist an electrostatic field in transferring an image of particles to a spaced-apart substrate, therefore, the reproduced image will be characterized by distinct toner intensity modulation. Such non-uniformity of toner intensity, referred to herein as intensity modulation, is not desirable in superior quality image reproduction.

Energy has also been transmitted from a piezoelectric crystal system in a similar manner to an image-forming metal plate in the form of ultrasonic flexual shock waves. Once again, excitation of the crystal system at a resonance frequency of the vibratory system results in maximum energy being imparted to the plate and, therefore, maximum excitation of the surface thereof by the flexual shock waves imparted to the plate. While such excitation of the surface of the plate is effective in assisting an electrostatic field in dislodging an image of particles pre-formed by the development of an electrostatic image thereon, the reproduced image will again be characterized by an intensity modulation resulting from the nodal pattern of the standing wave created in the plate at such resonance conditions.

The image-forming metal plates, e.g., stainless steel plates having a thickness of about one-sixteenth to one-eighth inch, are found to have their own distinctive, spaced-apart resonance frequencies peculiar to the plates themselves, apart from the resonance frequencies of the vibratory system as a whole, i.e., piezoelectric crystals, intermediate mass and printing plate. Excitation at such resonance frequencies of the plate has not been found satisfactory for the dislodging of particles from the surface of the plate. This ineffective action is due to the fact that the energy level of the shock waves imparted to the plate decreases rather rapidly as the driving frequency moves away from the resonance frequency of the vibratory system. The resonance frequencies of such plates, which exhibit definite mass characteristics, are found to be distinct and spaced relatively far apart, not only from one another but from the resonance frequencies of the vibratory system. As a result, the amplitude of excitation of the surface of the plate by flexual shock waves at a resonance frequency characteristic of the plate will be so much less than the maximum excitation that occurs at a resonance of the vibratory system itself as to be ineffective in dislodging particles from the surface of the plate. Sweeping or varying the driving frequency through a range including both the resonance frequency of the vibratory system and that of the plate is not effective in overcoming the toner intensity modulation referred to above.

By means of the thin metallic plate of the present invention, however, the undesired variations in the intensity of the reproduced image can be effectively overcome without, at the same time, jeopardizing the sharpness and clarity of the reproduced image. As used herein, the term "thin plate" is meant to include a metallic printing plate having such low mass characteristics that the plate will exhibit a series of very closely spaced resonances thereof when subjected to ultrasonic flexual shock waves over a relatively small frequency range, particularly such a range sufficiently close to the resonance frequency of the vibratory system so that the energy output of the crystal system over the effective range will impart sufficient excitation to the surface of the plate to effectively dislodge particles pre-formed thereon. The energy level required for this purpose will vary depending on the relative size of the crystal system employed, but will generally be at least about 50 percent of the maximum energy output level of the crystal system. While the range over which the driving frequency may vary while the energy output to the thin plate remains within the desired level will depend somewhat upon the level at which the particular resonance frequency of the vibratory system is found to exist, sweeping or varying the driving frequency through a range of about 5 percent on either side of the resonance frequency of the system will conveniently include a series, e.g. five to 10 or more, of resonance frequencies of the thin plate at which the energy output of the system will provide sufficient excitation to effectively dislodge particles from the surface of the plate. At a resonance of the system at about 50 kHz., for example, the driving frequency can conveniently be swept through an effective range of about 2.5 kHz. on each side of the range to provide a suitable range for the purposes of this invention. It will be appreciated, however, that the 5 kHz. frequency range indicated is illustrative only, with the important consideration being the use of a thin plate as described in which its essentially no mass characteristics make possible its excitation, when stretched under tension, through a series of resonances in a relatively small frequency range. The effective range of frequency sweep through which the thin plate herein provided will be excited in order to effectively overcome intensity modulation of the reproduced image will generally be from about 2 to about 10 kHz., more particularly about 4 to 8 kHz.

When the thin plate is thus subjected to a series of closely spaced resonances within such close proximity to the resonance frequency of the vibratory system, the energy level of the ultrasonic flexual shock at said series of resonance frequencies of the plate will be sufficiently high to provide a series of excitations of the plate surface adequate to effectively dislodge particles from the surface thereof. By sweeping the driving frequency through a range including such closely spaced resonances of the plate in proximity to the resonance frequency of the vibratory system, therefore, a series of nodal patterns may be superimposed upon one another, effectively extinguishing any discernible nodal pattern on the thin plate and any toner intensity modulation of the image of particles dislodged from said thin plate and reproduced on a spaced-apart substrate. The series of resonance frequencies of the plate will be sufficiently close to one another so that the distance between adjacent antinodes of maximum excitation of the plate surface is no more than about 1 or 2 millimeters, and the particle intensity of the reproduced image will have a uniformity not heretofore obtainable in techniques in which ultrasonic flexual shock waves are employed to assist an electrostatic field in dislodging particles from the surface of a printing plate or block. Since the thin plate of the present invention acts as essentially without mass, the loss of amplitude of the imparted signal due to absorption of energy, i.e., the dampening of the energy output of the crystal system, is minimized, thereby enhancing the amplitude of the flexual shock waves imparted to the plate. This constitutes a further significant advantage of the present invention over techniques previously proposed.

The thin plate herein provided must, of course, have sufficient thickness so as to possess at least the minimum strength necessary for use as an image-forming surface. The thickness should, however, be less than that at which the plate has an appreciable load or element of mass such that it introduces an element of mass into the vibratory system and has its own distinct, spaced-apart resonance characteristics. When the plate is of such thickness that it has such an element of mass, the superimposing of a whole series of plate resonances in proximity to the resonance frequency of the vibratory system as set forth above is not obtainable, and an image dislodged from the surface of such a plate by means of ultrasonic flexual shock waves in a non-contact electrostatic printing technique will be characterized by the intensity modulation that is overcome by the present invention. When the thin plate herein provided is a metal plate, the thickness thereof will be from about 0.0005 to about 0.050 inch, more particularly from about 0.0005 to about 0.025 inch. Such plates, conveniently of stainless steel or aluminum, preferably have a thickness of from about 0.001 to about 0.015 inch. In general, plates of greater thinness, consistent with the required strength to effectively serve as an image-forming surface, are preferred in order to minimize the half wave length of each individual nodal pattern, further facilitating the achieving of uniform image intensity in accordance with the practice of the present invention. When the metallic plate is not an all metal plate but comprises, for example, a metallized plastic, i.e., a plastic sheet or plate coated with a metal layer, the plate may have a thickness within the range hereinabove set forth or may have a greater thickness provided that the tensile characteristics of such a plate are equivalent to those of an all metal plate of the thickness indicated. That is, such a metallized plastic plate should exhibit a whole series of closely spaced resonance frequencies characteristic of an essentially massless plate so that particles can be dislodged therefrom by superimposing a series of nodal patterns on the plate so as to extinguish any discernible modulation on the plate and in the reproduced image on the spaced-apart substrate.

The piezoelectric system employed as herein provided must be of sufficient size so that its energy output is sufficient to provide excitation of the plate capable of assisting an electrostatic field in dislodging an image of particles from the surface thereof. The size and number of individual piezoelectric crystals employed will vary depending on the particular features of the system employed, the size and nature of the printing plate, the degree of reduction in the electrostatic field strength required, and the like. The energy output level of the crystal system can be increased by adding individual crystals to the system. The critical dimension of the crystals, for resonance either in the radial or longitudinal mode, is kept constant, of course, as additional crystals are added to the overall system. For thin plates made of stainless steel 0.001 inch thick and 4 inches wide in the form of a continuous belt stretched tightly over support rollers, three piezoelectric crystals connected electrically in parallel were used together on a common arbor in one of the support rollers. Each crystal was 1.5 inches long by 1.5 inches outside diameter with a 0.125 inch wall thickness. These piezoelectric crystals, designated PZT–4 by the Clevite Corporation, were found to exhibit large and pronounced resonant frequencies at 29 kHz., 45 kHz., and 60 kHz.

It will be appreciated that, by increasing the number of individual crystals employed, increased energy may be imparted to the thin metallic plate. It will generally be observed, however, that the relatively large amount of additional energy that must be applied to the crystal system for each relatively small additional increment of energy output makes it impractical and undesirable to overcome the problem of toner modulation by the use of oversized or an excess number of piezoelectric crystals. The generation of excessive heat is also likely to present an additional problem when such an oversized crystal system is employed. The present invention overcomes such problems by permitting maximum utilization of the capability of the piezoelectric crystals not only to effectively assist the electrostatic field in dislodging the image of particles but, at the same time, to fully overcome the problem of toner modulation as well. It should be emphasized that these highly significant advantages are achieved while reproducing an image of superiority and clarity.

The thin printing plate employed will be one on which a predetermined, non-random latent electrostatic image can conveniently be formed and developed with charged dielectric particles of opposite polarity. For this purpose, a non-conductive coating will generally be formed on an electrically conductive base material, such as stainless steel, aluminum, brass, titanium, and metallized plastic, e.g., metallized Mylar.

The latent electrostatic image can be formed by imparting electrical charges to the non-conductive coating on a thin plate, by surface or bound charges, imagewise or in a uniform manner. In the latter instance, the plate may be treated either before or after the imparting of the electrostatic charge so that the charge is retained in the desired image areas, but is dissipated to ground in the non-image areas thereof. The imagewise charging of a non-conductive coating may be achieved by means well known in the art, such as a cathode ray tube incorporating an electron beam that causes electrons to be conducted from the ends of fine wires on the outside of the tube in response to video signals or a stylus electrode also designed to deposit small dots of electrical charge imagewise on the non-conductive material.

The latent electrostatic image can also be formed by uniformly charging, as with a corona wire, a thin plate having a non-conductive layer pre-formed thereon in the desired image configuration. In this embodiment, the non-conductive image layer is conveniently formed by coating the metal base material with any conventional photo-resist material, such as Kodak KMER, that is hardened in the desired image areas upon exposure to ultraviolet light through a negative of the desired image. Any suitable conventional organic developer solvent can then be applied to dissolve the unhardened material in the unexposed non-image areas of the plate. An insulating or non-conductive layer in the desired image configuration is thereby formed on the conductive base material that may be grounded. The charge imparted by the corona wire will be retained in the non-conductive image areas, but will be dissipated to ground in the non-image areas of the plate. Such an insulating image need only be formed initially and may thereafter be recharged and developed a great number of times following each transfer of the developed image to the spaced-apart substrate in continuous type operations.

In another embodiment, a layer of photo-conductive insulating material, e.g., zinc oxide resin coatings, amorphous selenium films and the like, can be electrically charged, as by a corona wire, in the dark and exposed to light through a positive of the desired image so as to conduct the imparted charge away from the photo-conductive layer to the conductive base material and to ground where the light strikes the coating in the non-image areas thereof. The imparted charge is retained in the unexposed image areas of the photo-conductive layer so as to form the desired latent electrostatic image on the plate.

In developing the latent electrostatic image on the surface of the thin plate, many well known techniques may be employed for contacting the electrostatic image with charged dielectric particles of opposite polarity. Such techniques include cascade, magnetic brush and powder cloud development. In cascade development, fine toner material mixed with relatively coarse carrier material, such as glass beads, is cascaded over the surface having the electrostatic image thereon, with the toner being charged triboelectrically with a charge opposite to that of the charged image. In magnetic brush development, the carrier comprises a mass of iron filings that cling to a magnet in brush-like fashion. Toner particles cling to the iron filings and are triboelectrically charged with a polarity opposite to that of the latent image across which it is brushed by the iron particles. In powder cloud development, a cloud of finely divided particles, likewise having an electrostatic charge of opposite polarity to the latent electrostatic image, is brought into contact with said image. In each instance, the charged dielectric particles are retained by electrostatic attraction in the image areas but may easily be removed from the uncharged nonimage areas of the plate. A pre-determined, non-random image of dielectric particles is thus pre-formed on the thin printing plate.

Any commercially available dielectric or other triboelectric pigmentary material readily available in the art may be employed in the practice of the invention. Suitable droplets of liquid pigmentary material may also be employed. Carbon black, dye powders and resinous toner particles are illustrative examples of suitable dielectric particles. Solid toner particles comprise finely divided dispersions of pigments, such as carbon black, in resins such as, for example, ABS resins, polystyrene, polyvinyl chloride, polyvinyl acetate, butadiene/polystyrene resins and the like. Individual toner particles generally have a major dimension on the order of about 0.5 to about 10 microns. Representative commercial toners of this type include Sinclair and Valentine ARL 2502, 2509, 2152, 2267 and 2268 toners, Nashua toner for 914 Xerox machines and Xerox 914 toner. Glass beads for use as carrier material in cascade development techniques is readily available as is suitable iron filings, such as iron product AP-28 of Wright Industries, for magnetic brush development. The toner and carrier particles may be blended in any suitable weight ratio, as is well known in the art.

The thin, flexible printing plate may be shaped in any desired configuration suitable for the particular printing application. The thin plate may thus be flat, curved or otherwise formed to conform with the shape of the object being printed. It will also be appreciated that a flat printing plate can frequently be used in the printing of non-flat objects, or vice versa, depending upon the nature of the image to be printed and the particular requirements of a given printing application. For continuous printing operations, the thin plate is conveniently employed in the form of a rotatably mounted continuous belt. The application of this embodiment to a continuous printing is hereinafter discussed in greater detail.

In the techniques heretofore disclosed in the art, the particles are dislodged from their pre-formed position and transferred to the substrate by means of the electrostatic field established between the pre-formed particles and the substrate. The intensity of the electrostatic field required to dislodge the particles from their pre-formed position and to effect the transfer thereof to the substrate has generally been sufficiently high to incur the risk of disruptive and potentially dangerous field discharge. The required intensity of the electrostatic field is greatly reduced, in the practice of the present invention, by the application of ultrasonic flexual shock waves to the pre-formed particles. The ultrasonic shock waves assist the electrostatic field in overcoming the forces mentioned above that tend to cause at least a substantial portion of the particles to adhere to their pre-formed position. The ultrasonic vibratory shock waves thus facilitate the dislodging of the particles from their pre-formed position so as to permit the migration thereof to the substrate being printed under the operation of the electrostatic field. Since the electrostatic field is assisted in the dislodging of the particles from their pre-formed position, it need not be of the intensity that otherwise would be required in the absence of the present invention to effect practical dislodgement thereof. The term "practical dislodgement" as used herein is meant to cover a sufficient dislodgement of particles to provide an acceptable image on the receiving substrate in the form desired to be printed thereon. The electrostatic field need only be of sufficient intensity to effect the transfer of the particles to the substrate once they have been dislodged from their pre-formed position as provided herein.

The thin flexible printing plate may be subjected to flexual shock waves in the ultrasonic range by any of the commercially available ultrasonic transducer devices known in the art. The structural details of the ultrasonic transducer do not constitute a critical feature of this invention. Well known piezoelectric crystals are one type of ultrasonic transducer means found to be convenient for use in the practice of this invention. Such crystal systems may comprise barium titanates or mixed crystals of the titanate family. The crystal system employed may comprise one or more individual piezoelectric crystals, with the crystals arranged so that their vibratory effects will complement one another. The crystals may be stacked together and connected to a means for excitation so that the acoustic waves generated thereby are in unison, and the crystals tend to act as a single vibratory entity. The crystals may, for example, be conveniently connected in parallel to a single source of excitation or otherwise connected in any suitable manner as will readily be appreciated in the art.

Any suitable means for exciting the ultrasonic transducer employed may be used in the practice of the present invention. Most conveniently, a standard commercially available frequency generator may be employed to excite the piezoelectric crystal or other vibratory system being used. One such frequency generator unit comprises a conventional sine and square wave radio generator system having, for example, a sine wave range of 20–200,000 cps in four bands. If desired, the frequency generator unit may be attached to a conventional amplifier in order to supply an adequate output to the piezoelectric crystal system. Various other means known in the art, such as a DC pulser, may be employed to supply the excitation required to cause the desired mechanical vibratory shock waves in the ultrasonic range employed to dislodge the particles from the supporting surface.

While various means may be devised for connecting the ultrasonic transducer means to the thin flexible plate within the scope of this invention, the plate will frequently be supported along two edges, with one edge clamped, affixed, attached or otherwise connected to the transducer means either directly or indirectly. In those embodiments in which the thin plate is in the form of a continuous belt, the transducer means may conveniently be attached or connected to one of the belt-supporting rollers serving to position the image of particles in the desired printing zone facing but spaced apart from the substrate to be printed. The ultrasonic vibrations generated in the piezoelectric crystal or other transducer system may thus be transmitted through an intermediate mass, for example the roller shaft, directly to the roller which, in turn, generates flexual waves in the ultrasonic range in the thin printing plate positioned thereon.

In a preferred embodiment of the continuous belt system, it has been found particularly convenient to position the piezoelectric crystal system in one of the support rollers serving to position the pre-formed image of particles in the thin plate in the printing zone facing but spaced apart from the substrate to be printed. In this modification, the crystal system becomes an integral part of the roller over which the thin plate is passed. The vibratory system, comprising the plate, the crystal system, the roller and auxiliary inertial mass, is thus simplified and subject to more precise controls than when an intermediate auxiliary mass is employed to transmit the ultrasonic shock waves to the roller. Incorporation of the crystals in the support roller has the added advantage that the dampening effect due to absorption of the energy transmitted by the piezoelectric crystal is minimized, thereby enhancing the amplitude of the ultrasonic shock waves transmitted through the vibratory system to the thin printing plate. In addition, the available resonance frequencies of the vibratory system are closer together when the intermediate mass is eliminated or substantially reduced and the resonance characteristics of the system are determined by the crystal rather than by the crystal and a relatively large intermediate mass. Thus, the crystal can be excited at one or more of its resonance frequencies rather than at the further apart resonances characteristic of a vibratory system including the crystal and a relatively large intermediate or auxiliary mass. Incorporation of the crystals in the support roller has the added advantage of mechanical simplicity and convenience in commercial printing operations. In this preferred embodiment, a piezoelectric crystal or crystals may be employed in commercially available disc or tubular form of suitable size for incorporation as an integral part of a belt-supporting roller. PZT–4 piezoelectric material produced by Clevite Corporation, for example, may readily be employed. Tubular crystals of the same size may be mounted on a common support shaft or, alternately, crystals of different size may be concentrically mounted on the support shaft. The crystals will be connected electrically in parallel so as to vibrate as a unitary vibratory entity.

The present invention calls for the generation of ultrasonic flexual shock waves in the thin plate to assist an electrostatic field in dislodging a pre-formed image of particles therefrom. The ultrasonic transducer means will thus be excited at a driving frequency in the ultrasonic range, generally in the range of from about 20 to about 100 kHz., 1 kiloHertz (kHz.) being 1,000 cycles per second. The driving frequency will commonly be from about 25–30 kHz. to about 60–80 kHz., particularly from about 50 to about 80 kHz., although it will be appreciated that the particular frequency employed will depend upon the overall characteristics of the vibratory system being utilized. Included within the scope of the term "ultrasonic frequency", as used herein, are all frequencies produced by means of commercially available ultrasonic transducers, including harmonics of such frequencies.

The term "flexual shock waves", as used herein is meant to include mechanical shock waves or oscillations that travel through the thin plate so as to create surface vibrations characterized by locations of minimum excitation, i.e., nodes, and of maximum excitation, i.e., antinodes. At the so-called resonance frequencies, the interaction of the forward travelling imparted shock waves and the waves reflected from the edges of the plate result in a pattern of standing waves characterized by spatially fixed nodes and antinodes. It has been found that such standing waves are particularly effective in supplying the additional force required to assist the electrostatic field in dislodging the image of particles from the surface of said thin plate without, at the same time, blurring or destroying the sharpness or clarity of the image reproduced on the image-receiving substrate. Because of the electrostatic attraction between the charged dielectric particles and the thin plate having the developed electrostatic image thereon, relative lateral movement of the image of particles upon application of the ultrasonic shock waves is effectively prevented. The electrostatic attraction between the particles and the plate thus enables the particles to be propelled directly outward from the printing plate for transfer to the spaced-apart substrate in their desired image configuration for high quality reproduction.

As indicated above, the amplitude of the shock waves transmitted to the thin plate by the vibratory system is maximized, at any given amplitude of the crystal excitation signal, by excitation at a resonance frequency of the system. Since the thin plate has very little mass, the plate absorbs a minimum amount of the energy imparted to it, this low dampening effect enhancing the force available to assist the electrostatic field in dislodging the image of particles from the thin plate. The dislodging effect of the ultrasonic flexual shock waves will, at resonance conditions, be greatest at the points of maximum excitation and least at the nodes of minimum excitation. The distance between adjacent nodes is equivalent to one-half a wave length of the standing wave in the thin plate. Because of this nodal pattern, it will be appreciated that some variation in the toner or dielectric particle intensity will tend to exist in the reproduced image. Since the nodal pattern created in the thin plate will have relatively close spacing between adjacent nodes, the intensity modulation of the reproduced image may not be discernible or, in any event, may be existent within tolerable limits not inconsistent with high-quality reproduction.

The thin printing plate herein provided has the highly significant additional advantage of being readily employed in such a manner as to minimize or to essentially eliminate intensity modulation effects in the image being reproduced on the substrate being printed. The uniform intensity of the reproduced image further enhances the superior quality of the non-contact printing technique of the present invention in which a very sharp, clear and uniform image can be reproduced while avoiding the risk of disruptive arcing in continuous printing operations.

While the vibratory system will have a few particular, relatively apart frequencies at which resonance conditions will occur, the thin printing plate employed, which contributes virtually no mass to the vibratory system, will have numerous, relatively closely spaced frequencies at which resonance conditions will prevail with respect to the plate itself. It is possible, therefore, to sweep or vary the driving frequency through a small range, preferably including a resonance frequency of the vibratory system and thereby to excite the thin plate at at least two resonance frequencies of the plate. In this manner, at least two nodal patterns will be superimposed upon one another, effectively extinguishing discernible intensity modulation of the reproduced image. The superior quality of the reproduced image is thereby enhanced.

The driving frequency can readily be swept through a range sufficient to produce the image uniformity desired by simple operation of the conventional frequency generator unit employed. A swept of at least about 1 kHz., e.g., about 2 to about 5 kHz. will generally be sufficient to pass through several resonances of the plate, e.g., perhaps five to 10 resonances. By thus superimposing the two effects, namely the resonance of the vibratory system and the multiple resonances of the thin plate, the important advantages of the use of ultrasonic shock waves may be enhanced. Thus, the risk of field discharge is overcome by the superior dislodging effect of operations at several resonances, without impairing the clarity and sharpness of the image, and while at the same time eliminating any variations in the toner intensity of the reproduced image.

Since the half wave length of a particular standing wave in the thin plate will be less at relatively high driving frequencies than at lower frequencies, it has been found generally somewhat preferable to operate at relatively high frequencies, e.g., from about 50 to about 80 kHz. The use of relatively thinner plates will likewise tend to reduce the nodal pattern spacing on the surface of the thin plate. For superior toner uniformity, the half wave length of a standing wave imparted to the plate should generally not exceed about 1 to 2 millimeters. It will be appreciated, when, contrary to the present invention, the printing plate adds an appreciable element of mass to the vibratory system, a desired standing wave condition can only be achieved at the relatively far apart resonances that are characteristic of the entire vibratory system. When the desired flexual shock waves are imparted to such a system, therefore, it is not possible to achieve the fine grid effect so readily obtainable in the practice of this invention. It should also be empathsized again, that the excitation of the very thin printing plate herein provided at several resonance conditions thereof does not result in such relative lateral movement of the particles, pre-formed by development of an electrostatic image, as would cause blurring or impairment of the desired image configuration of the particles. Clarity and sharpness need not be sacrificed, therefore, in order to achieve uniform toner intensity.

The ultrasonic vibrational shock waves imparted to the image of particles assists the electrostatic field operative between the printing plate and the substrate in overcoming the electrical attraction and mechanical adhesion forces tending to cause the particles to adhere to their pre-formed position on the plate. The required electrostatic field strength, therefore, can be significantly less than that required when the electrostatic field alone is used to dislodge the image of particles. The lower field intensity not only greatly reduces the risk of arcing, or field discharge, in the printing gap, but also permits greater operational flexibility than heretofore existed. A lower field potential may thus be used across a given printing gap, and/or an increased spacing between the plate and the substrate may be employed at any given potential. This is of particular advantage with respect to the printing of irregular shaped objects and those with surface irregularities that increase the risk of a potentially dangerous field discharge. In the practice of the invention, the electrostatic field need only be of sufficient intensity to effect the desired transfer of the image of particles to the spaced-apart substrate once said image has been dislodged from the thin plate by the combined action of the field and the ultrasonic vibratory shock waves to which the image of particles is subjected.

The intensity of the electrostatic field employed is not a critical feature of the invention since the field strength required is not constant but will vary depending upon the particular circumstances of a given printing application. Thus, the field strength will depend to some extent upon such factors as the nature of the substrate being printed, the particular printing plate employed, the composition of the toner or other dielectric particles used, atmospheric conditions in the vicinity of the printing apparatus, the driving frequency and vibrational characteristics of the system, any printing gap or field potential limitations that must be observed, and other factors. In every instance, however, the present invention permits a significant reduction in field intensity without any adverse effect on the clarity or sharpness of the image transferred to and reproduced on the substrate being printed.

While the electrostatic field strength, and consequently the field potential, employed may vary depending on the circumstances of a given printing application, the field potential required will generally be less than about 10 kilovolts, with potentials of about 5 kilovolts or less often sufficient to achieve the desired pressureless, non-contact electrostatic printing.

In some printing applications, particular space requirements or characteristics of the substrate being printed will determine or fix the printing gap between the thin plate and the substrate. In other applications, the gap can be varied somewhat depending on other aspects of the system, e.g., the available or permissible field potential. In general, however, the printing gap will vary from about one thirty-second inch to about one-fourth inch or more although gaps outside this range may also be employed within the scope of the invention so long as pressure contact is avoided. A printing gap of from about one-sixteenth to about one-eighth inch is convenient for many printing applications.

In a convenient embodiment of the invention, either of a continuous or a non-continuous nature, an insulating image in the form desired to be printed is formed on the thin, flexible metallic plate. The plate is then with the charge being retained in the non-conducting, insulating image areas thereof, while the charge is run off to ground in the conducting, non-image areas of the plate. Dielectric particles having a charge opposite to that on the image areas of the plate are then brought in contact with the plate and are retained preferentially in the charged image areas thereof. Any residual charges in the non-image areas will not be sufficient to retain or hold the particles so that the particles may easily be removed from such non-image areas. An image of charged dielectric particles will thus be formed or developed on the surface of the thin plate. The image of particles is thereafter transferred to a spaced-apart substrate in the pressureless, non-contact printing operation herein described under the combined influence of an electrostatic field and the ultrasonic flexual shock waves imparted to the image of particles as called for by the present invention. After the image of particles has been transferred therefrom, the plate may be cleaned, as by brushing, in preparation for the next printing cycle. The spaced-apart substrate having the image of particles transferred thereto may be exposed to heat or otherwise treated so as to fix or permanently secure the image of particles to the substrate.

In the embodiment of the thin plate shown in FIG. 1, a thin, flexible printing plate having a thickness of less than about 0.015 inch and represented by the numeral 1 is shown mounted between support 2, to which it is secured by plate clamp 3, and the ultrasonic vibratory means generally represented by the numeral 4, to which it is secured by plate clamp 5. Vibratory means 4 and support 2 are secured to base 6 by means of set screws 7. Vibratory means 4 comprise two stacked piezoelectric discs, 8 and 9, with an intermediate electrode 10 connected to an ultrasonic frequency generator 12 by means of line 11. Frequency generator 12 is also connected to ground 13 by wire 14. A conventional audio amplifier unit, not shown, may be attached to or incorporated in frequency generator 12 so as to supply an adequate frequency output to vibratory means 4. By an adequate output is meant a sufficient energy output to cause ultrasonic shock waves to be generated in vibratory means 4 so that the ultrasonic flexual shock waves imparted to thin plate 1 clamped thereto are of sufficient magnitude to assist an electrostatic field established between grounded plate 1 and printing electrode 16 in dislodging image of particles 15 from their preformed position on plate 1. It will be appreciated that the energy imparted to the pre-formed particles in any given application will vary depending on the particular characteristics and features of that application, in much the same way as the electrostatic field intensity will vary as discussed above. When the energy applied by the ultrasonic shock waves is relatively high, the particles may actually be propelled from the thin vibrating plate by up to several particle diameters in distance due to the shock waves alone. This actual propelling of the particles is accomplished without disturbing the desired image configuration of the particles, and the particles are transferred to the spaced-apart substrate 17 to be printed without adverse effect on the sharpness or clarity of the pre-formed image. Electrode 16 is connected to a suitable D.C. source, not shown, by means of wire 18.

Stacked piezoelectric discs 8 and 9 with intermediate electrode 10 are clamped side by side between vibration-transmitting resonating blocks 19 and 20 by suitable bolts 21 and associated locking nuts. The grounded resonating blocks are of essentially equivalent size and shape to facilitate vibration of the system at a resonance frequency thereof, with thin, flexible printing plate 1 clamped to the end portion thereof so that ultrasonic vibratory shock waves generated in vibrating means 4 may be imparted to thin plate 1 as ultrasonic flexual waves and transmitted to the image of particles 15 pre-formed thereon. Conventional means may be incorporated in frequency generator 12 to permit the frequency to be varied over a sufficient range so that the plate is excited at one or more resonance frequencies of the vibratory system as discussed above.

Figure 2:
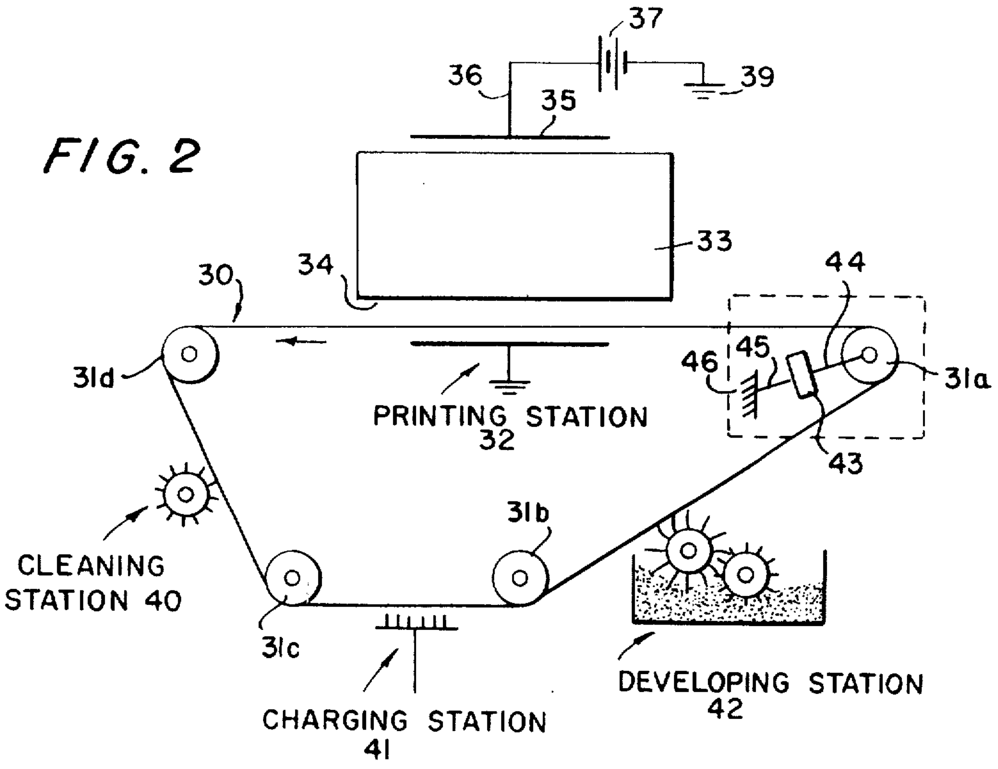
FIG. 2 is a diagrammatic illustration of an embodiment of the present invention utilizing a thin printing plate in the form of a rotatably mounted continuous belt.

The present invention may readily be adapted for continuous printing operations. One such embodiment in which the printing plate is in the form of a rotatably mounted continuous belt is shown in FIG. 2. Thin metallic belt 30 is rotatably mounted over rollers 31*a*, *b*, *c* and *d* positioned so that the plate is in a horizontal position at the printing station represented generally by the numeral 32. Also shown at printing station 32 is spaced-apart package 33, with surface 34 thereof to be printed positioned facing thin belt 30. Positioned above package 33 is conductive backing plate or high potential electrode 35 connected by wire 36 to D.C. source 37, which is also connected by wire 38 to ground 39. Thin belt 30 is also connected to ground 39. As the thin belt rotates in a counter-clockwise manner, its path of rotation passes consecutively cleaning station 40 at which point residual dielectric particles are brushed from belt 30, charging station 41 at which point the belt is charged by means of a suitable corona wire and developing station 42. The electrical charge imparted to belt 30 at charging station 41 is retained on the image areas thereof where an insulating image has been preformed thereon, but is dissipated to ground in the non-image areas where no insulating layer is present to retain the imparted charge. The electrostatic image thus formed is developed as the belt moves past developing station 42 where dielectric particles having a charge opposite to that imparted to the insulating image on belt 30 are brought into contact with or otherwise deposited on thin belt 30. The charged particles will adhere to the image portions of belt 30 but may easily be removed from the electrically conductive, non-image portions of the belt where any residual electrical charges are insufficient to retain the particles on the belt. A gentle flow of air or any other convenient means may be employed to assure that the particles are removed from the non-image areas of the belt.

Continuing the path of belt rotation, the belt passes over roller 31*a* that serves with roller 31*d* to position the belt with the developed image of particles thereon in the indicated horizontal position facing but spaced apart from package 33 at printing station 32. It will be appreciated that the printing plate may be positioned horizontally, vertically or in any other desired position, with the movement of the substrate above, below or alongside the plate coordinated therewith so that proper registry is maintained at the printing station during the pressureless, non-contact printing of the present invention. Roller 31*a* forms part of the ultrasonic vibratory or resonating system, with a piezoelectric crystal or other ultrasonic transducer system generally represented by the numeral 43 attached or connected thereto by means of the roller support shaft or other connecting means 44. Transducer system 43 is shown as being secured also to a support means 45 affixed to fixed support 46 or otherwise retained in a stable position. The connection of transducer system 43 to roller 31*a* may readily and conveniently be accomplished and, for this reason, is not described further herein with respect to minor mechanical elements forming no essential part of the inventive concept.

In operation, one or more images of insulating material are pre-formed on thin belt 30, which is rotated so that each insulating image passes charging station 41 so that the insulating image may be charged to form an electrostatic image. As this portion of belt 30 then passes developing station 42, the electrostatic image is developed by contact with charged dielectric particles, and the developed image is rotated into proper printing position at printing station 32 facing but spaced apart from package 33. A suitable conveyor means, not illustrated is used to deliver package 33 into proper position at station 32. When the image of particles on thin belt 30 and package 33 are in proper registry at station 32, the combined action of the electrostatic field established by electrode 35 and ultrasonic shock waves created by the activation of transducer system 43 upon positioning of the image in proper position facing surface 34 of substrate 33 serve to dislodge the image of particles from their pre-formed position on thin belt 30 and to transfer the particles across the printing gap and to reproduce the image in the form desired to be printed on surface 34. Activation of ultrasonic transducer 43 causes ultrasonic shock waves to be transmitted through intermediate connecting mass 44 to roller 31*a*. Ultrasonic vibration of roller 31*a* causes ultrasonic flexual waves to be generated in the portion of belt 30 between roller 31*a* and 31*d*, i.e. including the portion having the image of particles at printing station 32. The electrostatic field intensity may thus be significantly lower than would otherwise be required to dislodge the image of particles from belt 30. A lower potential at electrode 35 and/or a greater spacing between belt 30 and package surface 34 can be employed, therefor than that required when the image of particles is to be transferred by means of the electrostatic field alone. The amplitude of the shock waves imparted to the image of particles is enhanced by exciting ultrasonic transducer 43 at a resonance frequency of the vibratory system. Since thin belt 30 has practically no mass, the vibratory system including the transducer, vibration-transmitting roller and intermediate mass can be designed for any desired resonance frequency with the plate itself having practically no effect on the resonance characteristics of the system. Any discernible intensity nodulation of the image on surface 34 can readily be extinguished by sweeping the driving frequency through a small range so that several resonances of thin plate 1 may be superimposed on one another.

Figure 3:
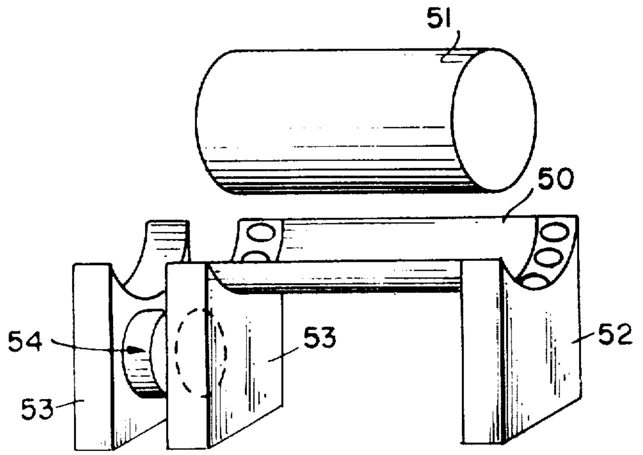
FIG. 3 is a side elevational view of an embodiment of the present invention adapted for the printing of cylindrical surfaces.

In FIG. 3, the thin printing plate 50 is shown with a concave configuration particularly adapted to conform with the cylindrical side surface of can 51 to be printed. One end of plate 50 is attached to support 52 while the other end is attached to one of two resonating blocks 53 to which one or more piezoelectric crystal discs 54 are secured. Other features, not shown, of this embodiment may be essentially the same as those shown with respect to a flat printing plate in the illustration of FIG. 1.

Figure 4:
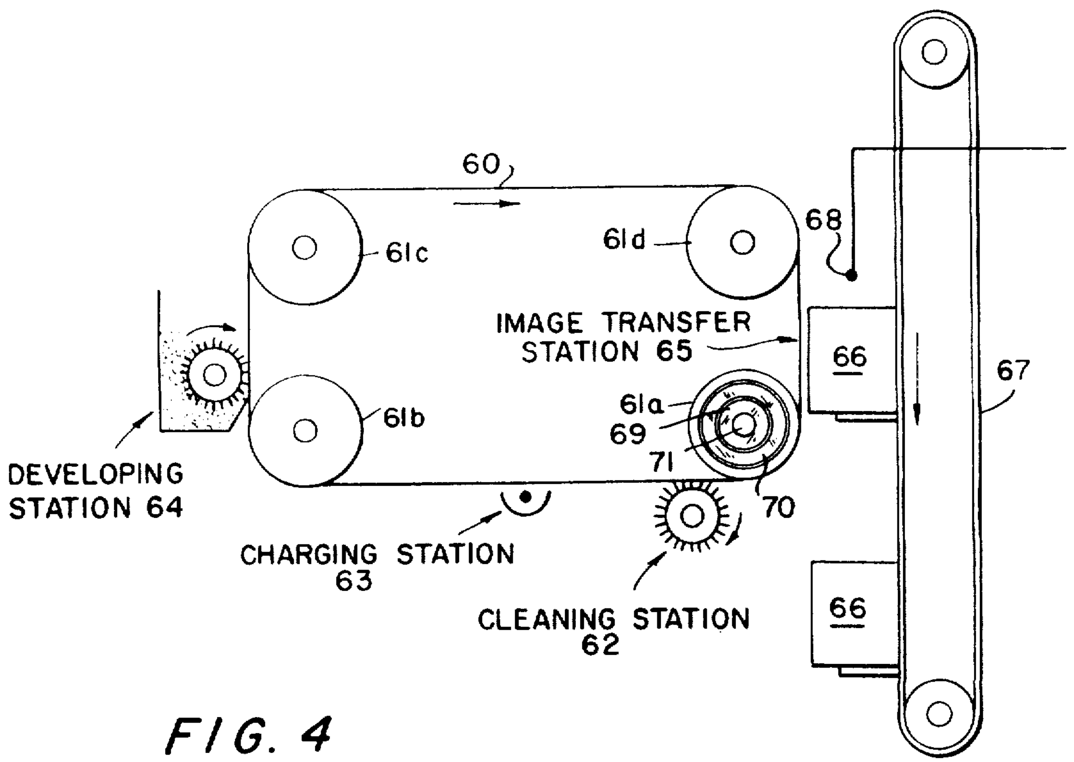
FIG. 4 is a partial diagrammatic view illustrating the incorporation of the ultrasonic transducer as an integral part of a belt support roller.

The continuous belt embodiment of the present invention illustrated in FIG. 4 is similar to the embodiment of FIG. 2 except that the thin belt is vertically positioned at the printing station and the piezoelectric crystals are shown as an integral part of a support roller rather than being attached thereto as in FIG. 2.

In FIG. 4, thin belt 60 is rotatably mounted for clockwise rotation over rollers 61*a*, *b*, *c* and *d*. The path of rotation of belt 60 passes cleaning station 62, charging station 63, developing station 64 and image transfer station 65 at which point belt 60 is vertically oriented. Substrates 66 to be printed are brought into proper position facing thin belt 60 but spaced apart therefrom by means of conveyor belt 67. An electrostatic field is established between grounded belt 60 and substrate 66 by means of high potential electrode 68 suitably positioned in the vicinity of the substrate being printed. In this embodiment, piezoelectric cylindrical crystals 70 are mounted on metal base roller 69 to form an integral part of roller 61*a* that, together with roller 61*d*, serves to position the portion of belt 60 therebetween at image transfer station 65 in a vertically oriented position facing substrate 66. Such cylindrically shaped crystals 70 and metal base roller 69 are mounted on hub section 71 of roller 61*a* and can be conveniently connected by suitable electrodes, not shown, to a conventional ultrasonic frequency generator unit, also not shown, as heretofore disclosed so as to vibrate in unison as a single vibratory entity. Excitation of this vibratory system in roller 61*a* causes ultrasonic vibratory shock waves to be transmitted directly to thin belt 60 positioned thereover so as to create flexual shock waves in the ultrasonic range in said belt between rollers 61*a* and 61*d*, thereby transmitting ultrasonic shock waves to the image of particles pre-formed thereon. As in the embodiment of FIG. 2, the pre-formed insulating image on belt 60 is carried past charging station 63, where an electrostatic image is created, and developing station 64, where the electrostatic image is developed, prior to passing to image transfer station 65. When the image is positioned at station 65, mechanical shock waves in the ultrasonic range are transmitted to the image of particles on belt 60 by excitation of crystals 69 and 70 so as to assist the electrostatic field created by the energization of electrode 68 in overcoming the forces tending to cause the particles to adhere to their pre-formed position on belt 60. Once the particles have been thus dislodged, they are transferred to substrate 66 in the form desired to be printed by the electrostatic field. After the transfer of the image of particles therefrom, the belt or belt section passes cleaning station 62 where residual particles are brushed, drawn or otherwise removed therefrom so that the insulating image-bearing section of the belt will be in proper condition for recharging as the belt is rotated through its next printing cycle. In the practice of the cyclic operation herein set forth, the printing plate and the substrate being printed may each be stopped at the image transfer station so that the pre-formed image of particles on the plate and the substrate are in stationary, spaced-apart relationship during the image dislodging and transfer operation. After the transfer of the image, the plate and the printed substrate are then moved so that another pre-formed image of particles and another substrate may be advanced to the image transfer station. In another embodiment, the thin plate bearing the pre-formed image and the substrate to be printed may both be advanced through the transfer station without coming to a position stationary therein. The speed and direction of motion of the printing plate and the substrate are such that they are maintained in proper registry across the separating gap so that the pre-formed image of particles can be transferred to and reproduced on the substrate in the form desired to be printed.

Prior to the steps in the printing cycle discussed with respect to FIGS. 2 and 4, the desired image must be pre-formed as an insulating layer on the surface of the thin, metallic printing plate, which will generally be a non-porous metallic belt impervious to the flow of fluids therethrough. Various techniques heretofore known in general terms for forming such an insulating image can be used in the practice of this invention. It has been found that the insulating image can conveniently be formed by coating the thin metallic plate with a light sensitive photo-resist type insulating material that hardens and becomes insoluble in organic solvents upon exposure to light. Many such coating materials are commercially available, e.g. Kodak Photo Resist (KPR), Kodak KMER photo-resist material, various diazo sensitizers and numerous other materials known and disclosed in patent and literature references. The coated plate is thereafter dried and exposed to actinic light, e.g. with an arc lamp, through a negative of the image so as to expose the coating and render it insoluble in organic solvents in the desired image areas thereof. The insulating image can then be developed by using a suitable, commercially available developer composition, e.g. Kodak KMER developer. The composition containing one or more organic solvents serves to dissolve the light sensitive material in the unexposed, non-image areas of the plate, but does not dissolve the coating in the exposed, image areas of the plate. An insulating layer having the desired image configuration, i.e. an insulating image, often approximately 0.1 to 0.2 mils thick is thus formed on the surface of the metallic plate.

While the above technique is convenient, relatively inexpensive and generally preferred, it will be appreciated that other techniques may be employed within the scope of the invention for pre-forming the desired image of particles on the thin, flexible printing plate. Thus, the grounded metallic plate can be coated with a commercially available electro-photoconductive material, as for example zinc oxide in a resin binder, uniformly charged and exposed to light through a positive of the desired image. In the thus-exposed non-image areas of the plate, the coating becomes conductive upon exposure, and the charge is dissipated to ground through the metallic plate. In the unexposed image areas of the plate, the charge is retained by the coating and may be developed by contact with dielectric particles bearing the opposite charge.

The charging of the plate having an insulating image pre-formed thereon or other charging operations herein provided can conveniently be accomplished by means of a conventional corona wire. Such wires will frequently be from about 0.0035 to about 0.005 inch in diameter and may be stretched across the width of the plate at some convenient distance, e.g. three-eighths inch, from the surface of the plate. An electrically grounded shield may be placed about one-fourth inch away from the wire so that corona current not directed at the printing plate will be collected by the shield. For instance, the wire may be connected to a source of highly positive D.C. potential, e.g. about 7,000 volts, so as to cause a corona current of positively charged ions, e.g. about 100 microamperes, to drift towards the plate. Various modifications or refinements in the corona unit may be employed, the details of which are not a critical feature of the invention.

In the development of the electrostatic image on the printing plate as herein provided, various well-known development techniques may be employed. The image may be developed, for example, by various triboelectric techniques such as brush development or cascade development in which a mixture of toner or other dielectric particles and glass carrier beads are passed over the plate surface containing the electrostatic image. Well-known magnetic brush development techniques may also be employed in which a mixture of iron and toner particles are picked up by a magnet and brushed across the plate bearing an electrostatic image thereon. In each of these instances, the toner or other dielectric particles is charged triboelectrically by the glass carrier beads or iron particles. The toner is attracted to the oppositely charged insulating image areas of the plate but are not attracted or retained on the uncharged, conductive non-image areas thereof. Other well-known techniques may also be used to develop the image, e.g. the aerosol or powder cloud development technique, the dielectric particles being charged with the proper polarity by triboelectric, inducting corona or other charging techniques.

At the image transfer station, the electrostatic field between the thin printing plate and the object to be printed may be established by means of a conductive backing plate positioned behind the substrate being printed or by a high tension electrode conveniently positioned behind or in the vicinity of the substrate. The use of a high tension electrode is particularly advantageous in the printing of three-dimensional objects, e.g.

bottles, in which it may not be feasible to position a conductive backing plate behind the surface of the object on which printing is desired. It has been found that a high tension, or potential, electrode can be positioned within a three-dimensional object behind the surface to be printed or may be otherwise conveniently positioned to the side or over or under the substrate to be printed provided, of course, that the positioning of the electrode is such that an electrostatic field of the desired intensity is thereby established and operative between the substrate to be printed and the spaced-apart image-forming surface in the printing zone. When the surface of the object to be printed is of very low conductivity, it will be appreciated by these skilled in the art that the high tension electrode or conductive backing plate may have to be placed close behind the surface to be printed in order to reduce the drop in potential between the surface to be printed and the electrode or plate and establish the desired electrostatic field between said surface and the spaced-apart image-bearing surface.

A wide variety of commonly printed substrates are composed of material having a relatively low electrical resistivity, that is a resistivity of no greater than about $10^{14}$ - $10^{15}$ ohm-cm. Such materials include, but are not limited to, paper, wood, brick, stone, plaster and glass. In the printing of such materials, the present invention permits a maximum permissible reduction in the required electrostatic field intensity. For substrate materials having an electrical resistivity of more than about $14^{14}$ - $10^{15}$ ohm-cm, however, the permissible reduction in field strength and flexibility in conducting pressureless, non-contact electrostatic printing are limited by the insulator characteristics of the substrate. Such materials include plastics, such as polyethylene, polypropylene and teflon. The high resistivity characteristics of such plastics may thus tend to limit the permissible spacing between the printing plate and the substrate for high quality image reproduction or substrates composed thereof. A higher field potential may also be required as compared with that required in the practice of the invention when employing low resistivity substrates. It will nevertheless be appreciated that the ultrasonic flexual waves imparted to the thin plate will serve to facilitate the dislodging of the particles from their pre-formed position on the thin plate irrespective of any modifications required to assure that a suitable electrostatic field is operative between the printing plate and the spaced-apart substrate to be printed.

In the printing of such high resistivity substrates, the field potential may conveniently be established by means of a conductive backing plate positioned immediately behind the substrate surface to be printed. This embodiment is suitable for flat substrates but is not readily adaptable in the printing of three-dimensional objects, such as bottles. In the printing of bottles or other objects for which the positioning of a conductive backing plate behind the surface being printed is inconvenient or impossible, a high potential electrode may be placed alongside the object and a second auxiliary electrode may be inserted within the object close behind the surface to be printed. Image resolution on the surface of high resistivity bottles and other liquid holding objects can also be improved by filling the bottles to be printed with a moderately conducting liquid, e.g. water.

The method of crystal or other ultrasonic transducer excitation has also been found important in achieving the highest quality of image reproduction. With very small printing gaps, e.g. one-sixteenth inch and up to about one-eighth inch, excitation of the piezoelectric crystals by the frequency generator-amplifier unit or combination can occur instantaneously at full amplitude or the amplitude of excitation can be increased from a lower value to a higher value nearly instantaneously, with the time required to reach full value being on the order of a fraction of a second, e.g. about 0.1 second. It is preferred, for high quality image reproduction, that the amplitude of the voltage signal from the frequency generator-amplifier unit be thus increased from a lower value to full value rather than being instantaneously applied at full voltage value. For this purpose, the amplitude of the signal to the vibratory system is increased to full value from zero value or from a nominal, low energy level at which the energy output of the crystal system will be insufficient to impart excitation to the surface of the thin plate sufficient to effectively dislodge particles preformed thereon. It will be appreciated that the full value of the amplitude of the signal will depend upon the characteristics of a given printing system, including the degree of tension on the thin plate or belt, the size of the plate or belt, the size and type of crystals employed, the number of crystals employed, and the like. At full amplitude, of course, the image of particles on the thin plate is thus dislodged from the plate and transferred across the printing gap to the substrate nearly instantaneously. A cloud of toner or other dielectric particles, nevertheless retaining their desired image configuration, is thereby created in the air gap by the rapid increase in amplitude and sweeping of driving frequency at such instantaneous excitation. This cloud of particles in the gap is subject to mutual electrostatic repulsion that would tend to cause some distortion of the printed image if the instantaneous current of particles in the printing gap were to traverse a gap of more than about one-eighth inch. In one important printing application, namely on the ends of cans, the minimum air gap is about three-sixteenths inch or one-fourth inch. In such circumstances, it has been found that this tendency for mutual repulsion can be largely overcome by increasing the amplitude of the ultrasonic signal slowly, and likewise sweeping or varying the frequency, if this is done, slowly so as to keep the instantaneous toner current in the gap relatively low. At such larger gaps, therefore, the interval of time utilized for increasing the amplitude of the signal and sweeping the driving frequency should be relatively long, i.e. from 1 to about 5 seconds, with an interval of from about 1 to about 2 seconds generally being sufficient. When the frequency is driven through a range encompassing more than one resonance frequency, the time interval may extend to from about 3 to about 5 seconds. It will be appreciated that the increase in amplitude and the sweeping of the driving frequency, e.g. over a range of about 5–10 percent over and under a desired frequency setting, will also take place upon excitation of the ultrasonic transducer system when printing across smaller gaps but that the interval of time required for these changes can readily be reduced to a fraction of a second by simple variation in the rate of frequency tuning and amplitude adjustment of the controls available on standard commercially available equipment.

After the image of particles has been transferred to the substrate being printed, the substrate may be treated by heat or other known means, such as solvent vapor, overspraying with a suitable varnish, or the like, in order to permanently secure or fix the reproduced image on the surface of the substrate. In thermal fixing, the time and temperature employed will depend on the particle toner or other particles employed, the nature of the substrate, etc. Temperatures of from about 90° to about 125° C. are generally satisfactory for commercially available toner compositions. The desired thermal fusing may conveniently be accomplished by the use of high intensity infra-red lights.

After the image has been transferred from the thin printing plate, the plate may be re-used as by forming an electrostatic image and developing that image in the next cycle of the printing operation. Prior to recharging the insulating image, however, it is highly desirable that auxiliary or residual toner be removed from the plate so as to avoid imparting the wrong polarity to such toner and possibly fusing the toner to the plate. This cleaning operation, as shown in FIGS. 2 and 4, can readily be accomplished by means of a soft, high-speed rotating brush. If desired, a vacuum may also be employed at the cleaning station to facilitate the removal of such residual toner from the thin plate prior to recharging.

In the practice of the invention employing the embodiment generally as shown in FIG. 4, a thin stainless steel plate 0.001 inch thick × 4 inches wide was formed in a continuous belt and stretched over supporting rollers as shown. The plate had a non-conductive or insulating layer approximately 0.1 to 0.2 mils thick formed thereon in the desired image configuration. The image was formed by spraying Kodak KMER photo-resist on the plate and air drying and then baking at 80° C. for 20 minutes to remove all solvents. A full size photographic negative of the desired image was placed directly over the photo-resist coating on the plate and exposed to a very strong arc lamp for 3 minutes. The image was developed in conventional Kodak KMER developer for 2 minutes to dissolve the photo-resist in the unexposed non-image areas of the plate. The plate was then rinsed with water, dried, and baked in an oven at 120° C. for 10 minutes to harden the image.

The image-bearing section of the plate was moved past the charging station where a shielded corona wire 0.005 inch in diameter was stretched across the plate and charged to a positive D.C. potential of about 7,000 volts. A corona current of about 100 microamperes of positively charged ions were thus caused to drift towards the plate. The charges were captured and retained on the insulating areas of the photo-resist image, but were dissipated to ground in the uncoated non-image areas of the metal belt. A latent electrostatic image was thus formed on the belt.

At the image developing section, this latent electrostatic image was developed by means of a magnetic brush that wiped bristles of a mixture of iron and toner across the belt as the electrostatic image-bearing section was passed thereunder. The iron particles were a grade known as AP–28, manufactured by Wright Industries, Brooklyn, N.Y. The toner mixed therewith was Nashua for 914 Xerox machines, with a particle size of from about 5 to 20 microns. The toner and iron were originally blended in a 1:1 weight ratio. The toner particles in admixture with the iron particles were triboelectrically charged negative and were thus attracted to the positively charged image areas of the belt.

When the image-bearing section of the continuous belt, was rotated to the image transfer station, the pre-formed image of toner particles was positioned facing but spaced apart from the substrate to be printed. The metal belt was maintained at ground potential, and a D.C. electrode was positioned near the substrate. This electrode was charged at potentials of from about 2 to about 10 kilovolts. The printing gap between the belt and the substrate was maintained at values of from about one-sixteenth to about one-fourth inch, with the field strength being generally from about 16,000 to about 30,000 volts per inch. The image of particles on the belt were transferred to the substrate at such field strengths in the practice of the present invention, whereas field strength of on the order of 40,000 to 60,000 volts/inch were required when transfer was attempted by means of the electrostatic field alone. At these higher field strengths, the risk of disruptive arcing in the gap was a genuine one with such arcing frequently occurring at a field strength lower than that required for image transfer due, in many instances, to localized areas of high intensity caused by surface irregularities on the substrate being printed. At the lower field strengths at which transfer was accomplished in accordance with the teachings of the present invention, the risk of field discharge was not present.

To assist the electrostatic field in overcoming the electrical and other forces holding the toner particles to the belt, three Clevite Corporation PZT–4 piezoelectric crystals 1.5 inches long × 1.5 inches O.D. 0.125 inch wall thickness piezoelectric crystals were mounted on a common shaft in the roller corresponding to roller 61*a* of FIG. 4. The crystals were connected together in parallel so as to vibrate as a unitary body. Large resonance frequencies of this vibratory system were found to exist at 29, 45 and 60 kHz. The crystal system was excited at its resonance frequencies by sweeping the driving frequency through a range including frequencies up to about 5–10 percent removed from the resonance frequency on either side of the resonance frequencies of the vibratory system. The thin belt having essentially no mass was thereby excited by the ultrasonic flexual shock waves transmitted to the thin belt at a whole series of resonances sufficiently close to the resonance of the vibratory system so as to effectively dislodge toner particles from the belt. The image was thereby transferred not only at an acceptably low field strength, with superior clarity and sharpness of the reproduced image, but with a uniform toner intensity without any undesirable modulation effects. Following transfer of the image therefrom, the belt was moved past a cleaning station at which a nylon brush cleaned residual toner particles from the belt prior to recharging at the charging station. The printed substrates, which included flat and corrugated cardboard substrates, glass bottles, and the like, were removed from the image transfer station to a fixing station at which the image was more permanently secured to the substrate by the heat of infrared lamps.

When the printing gap was very small, e.g. about one-sixteenth inch, excitation of the piezoelectric crystals occurred nearly instantaneously. As the printing gap was increased to about three-sixteenths inch and above, it was found desirable to increase the amplitude of the ultrasonic signal to the crystals over a period of from about 3 to 5 seconds in order to achieve superior quality reproduction. Likewise, at such larger gaps, the frequency was swept through the desired range slowly, also over a period of about 3–5 seconds, as opposed to the fraction of time in which the increase in amplitude and sweep of frequency was accomplished when smaller printing gaps were employed. In this manner, the instantaneous current across the larger printing gap was kept sufficiently low so that the image was not subjected to any distortion arising from mutual repulsion of particles as said particles cross the printing gap. Operation at the higher resonance frequencies of the system, particularly over 50 kHz, appeared most advantageous for purposes of the invention.

The present invention offers particular advantages with respect to the printing of non-flat or irregular surfaces. The presently available systems in which the printing plate contacts the substrate to be printed are generally unsuitable for such applications because of the difficulty in establishing uniform contact and transfer of the printing particles. In addition, it should be noted that the substrate being printed in accordance with this invention is at the outset image-free and need not be coated or treated in any manner so as to pre-form an image of any kind thereon prior to the transfer of the particles thereto as herein provided. This feature represents a significant advantage over those types presently available in which the particles are transferred to a substrate that has been coated or treated in some manner prior to the printing operation.

The present invention may readily be employed for either single or multi-color printing. If multiple color printing is desired, duplicate image transfer stations as herein provided may be positioned along the path of the substrate being printed in proper registry to accommodate each of the colors desired to be printed on the substrate. Each color may be applied to the substrate and thereafter fixed at one time unlike screen printing and similar techniques where each color must be dried before the next one can be applied. Alternately, individual printing stations may conveniently be positioned to transfer in proper registry pre-formed color portions of the desired image from a thin printing plate to the spaced-apart offset cylinder or other offset plate. The transfer of each portion of the multi-color image is accomplished by an electrostatic field between each printing plate and the offset plate assisted by ultrasonic shock waves imparted to the printing plates as herein provided. The offset plate may be positioned so that the pre-formed multi-color image of particles thereon is facing but spaced apart from the substrate to be printed. The multi-color image is then transferred to the substrate by an electrostatic field and ultrasonic shock waves in a further application of the pressureless, non-contact printing technique of the present invention.

An additional advantage of the present invention is the discovery that a pre-determined non-random image of particles can be transferred across a printing gap to the image-receiving substrate in the form desired to be printed thereon as herein provided without destroying or impairing the sharpness and clarity of the desired image. In the practice of the present invention, the image of particles is transferred from the image-forming surface to the spaced-apart image-receiving substrate under the influence of the electrostatic field established between the image-forming surface and the substrate to be printed. The ultrasonic flexural shock waves to which the particles are subjected while in their pre-determined, non-random image configuration on the image-forming surface permits the transfer to be accomplished at an electrostatic field intensity significantly less than that at which the possibility of a potentially disastrous field discharge becomes a significant risk.

The mechanical shock called for by the present invention is of sufficient magnitude to assist the electrostatic field established between the pre-formed particles in image configuration and the image-receiving substate in overcoming the forces tending to cause the particles to adhere to their pre-formed position. The shock or sharp pulse of energy thus facilitates the dislodging of the particles from their pre-formed position and the subsequent migration thereof to the substrate. In most instances, the sharp pulse of energy will be of sufficient effect to not only dislodge the particles but to propel them with a small initial velocity into the electrostatic field. The intensity of the electrostatic field can, of course, be minimized when the pulse of energy provides this degree of assistance in overcoming the mechanical adhesion or electrical attraction forces that tend to cause the particles to adhere to their pre-formed position.

The process of the present invention may readily be employed in commercial printing operations. The non-random image of dielectric particles may be pre-formed on the image-forming substrate, or a portion thereof, as herein provided or by other known techniques in advance of said substrate being moved into its desired position at a printing station. The image of particles on the image-forming substrate and the object to be printed may then be brought into stationary, spaced-apart relationship at the printing station. After the image has been rapidly transferred across the gap to the object being printed as herein provided, the image-forming substrate and the printed object may be removed from the printing station, and another pre-formed image and object to be printed may be advanced to the printing station as printing operations are continued. In another embodiment, the image-bearing substrate and the object to be printed may both be advanced through the printing station without coming to a stationary position therein. The speed and direction of motion of the image-forming substrate and the object to be printed are such that they are maintained in proper registry across the separating gap at the printing station so that the pre-formed, non-random image of particles can be transferred across the gap and reproduced on the object to be printed in the form desired to be printed thereon. In this embodiment, additional pre-formed images and objects to be printed may continuously be fed to the printing station as operations are continued.

The superior image reproduction obtainable by means of the present invention represents a highly significant advance in the field of non-contact electrostatic printing. The invention not only eliminates the major obstacle to such printing occasioned by the serious risk of field discharge, but also accomplishes this result in a manner that enhances the uniformity as well as the sharpness and clarity of the reproduced image. This superior image quality, particularly the extinguishing of intensity modulation of the reproduced image, has not heretofore been possible in non-contact electrostatic printing techniques in which cyclic printing operations of a continuous nature may conveniently be carried out at electrostatic field strengths far less than those at which arcing is likely to present an undue and acceptable risk. Great flexibility is thereby achieved. The field potential may be lowered, if desired, and the spacing across the printing gap may be increased. By easing the very tight spacing requirements that might otherwise be imposed, the present invention overcomes the practical problems of object placement and movement that might otherwise exist in the printing of non-flat objects, including cartons, bottles, containers and three-dimensional objects of any shape or form. In the printing of such objects, surface irregularities cause variations in field intensity presenting a problem of unacceptably high localized field intensities. The lower level of field strength required in the practice of the present invention overcomes this problem and permits a flexibility of operation heretofore obtainable only at the sacrifice of the quality of the image transferred across the printing gap and reproduced on the image-receiving substrate.

While the invention has been described herein with respect to particular embodiments thereof, it will be appreciated that various changes and modifications can be made without departing from the scope of the invention as set forth in the appended claims.

Therefore, we claim:

1. An improved pressureless, non-contact electrostatic printing process for the transfer of a pre-formed image of dielectric particles to an image-receiving substrate comprising:

a. forming a predetermined, non-random image of charged dielectric particles in the form desired to be printed at an image-forming zone on a thin, flexible image-forming plate in the form of a rotatably mounted continuous belt capable of being flexed at ultrasonic frequencies;
b. rotating said thin plate so that said image of particles thereon is positioned at an image transfer zone;
c. positioning said image-receiving substrate facing the image of particles but spaced apart therefrom at said image transfer zone;
d. establishing an electrostatic field between said image-receiving substrate and said image of particles on said thin plate, said field being of insufficient strength to effect by itself the practical dislodgement of the image of particles from said thin plate but of sufficient strength to effect the transfer of said image of particles to the image-receiving substrate in the form desired to be printed thereon once dislodged from said thin plate; and
e. exciting at an ultrasonic frequency a piezoelectric crystal positioned in one of the support rollers serving to position the image-bearing section of said thin plate in the image transfer zone, thus imparting mechanical vibratory shock waves in the ultrasonic range through said roller to said thin plate so as to transmit to said image of particles ultrasonic shock waves of sufficient magnitude to assist said electrostatic field in overcoming the forces tending to cause at least a substantial portion of the particles to adhere to their pre-formed position on the surface of the thin plate, whereby the practical dislodgement of the particles pre-formed in the desired image configuration may be effected, and the image of particles may be transferred to and reproduced on the spaced-apart substrate in the form desired to be printed thereon at an electrostatic field intensity less than that required for transfer by means of the electrostatic field alone, the relatively close spacing of the nodal patterns of the ultrasonic vibrational shock waves imparted to said thin plate being flexed and transmitted thereby to said image of particles serving to enhance the clarity and sharpness of the image transferred to and reproduced on the spaced-apart substrate to be printed.

2. The process of claim 1 in which said thin plate is excited at a driving frequency within the range of from about 20 kHz. to about 100 kHz.

3. The process of claim 2 in which said driving frequency comprises a resonance frequency of said vibrating system so that a standing vibrational shock wave is created in said thin plate, thereby maximizing the amplitude of the mechanical shock imparted to said image of particles by said ultrasonic vibration transmitted to said thin, flexible plate by said piezoelectric crystal in said support roller.

4. The process of claim 3 in which the amplitude of the excitation signal is raised from a lower value to full value and the driving frequency is swept through a range including at least one resonance frequency of the vibratory system.

5. The process of claim 4 in which said driving frequency is swept through a range of about 2 to about 10 kHz including said resonance of the vibrating system, thereby exciting the thin plate at a series of resonances thereof thereby extinguishing any discernible intensity production of the image reproduced on the substrate.

6. The process of claim 1 in which said thin plate is a metallic plate and the forming of the predetermined image of particles thereon comprises:

a. forming an electrostatic image on the surface of said plate in said predetermined, non-random image configuration; and b. developing said electrostatic image by contacting said plate surface with charged dielectric particles of opposite polarity to that of said electrostatic image, said dielectric particles thus being retained preferentially on the surface of said plate by electrostatic forces in the image areas.

7. The process of claim 6 in which the forming of said electrostatic image on the surface of said thin plate comprises:

a. coating at least a portion of said thin plate with a light sensitive, photo-resist insulating material soluble in organic solvents;

b. exposing said coating to light through a negative of the desired image to form a light sensitized latent image on said coating, the thus exposed image areas of said coating material being insoluble in said organic solvents;

c. developing said latent image by dissolving said coating preferentially in the unexposed, non-image areas thereof with an organic solvent therefor, thus leaving an insulating image of exposed coating material on the surface of said metallic plate; and d. charging said thin plate by means of a corona discharge, said charge being retained by the insulating material in the exposed image areas of the plate and being dissipated to ground in the unexposed, non-image conductive areas of said plate.

8. The process of claim 6 in which the rotation of said continuous belt is stopped when the image-bearing section thereof is positioned at said image-transfer zone, facing but spaced apart from said image-receiving substrate, and the rotation of said belt is thereafter continued following transfer of said image of particles to the image-receiving substrate.

9. The process of claim 6 in which the rotation of said continuous belt is continued as the section thereof bearing an image of particles passes through said image transfer zone, facing but spaced apart from said image-receiving substrate, said substrate also being continuously moved so as to maintain proper registry between said image-bearing section of the continuous belt and said substrate during the image transfer operation.

10. The process of claim 6 and including the cleaning of the image section of said continuous belt after said section leaves the image transfer zone and prior to the forming of the next electrostatic image thereon as said image transfer operations are continued.

11. An improved pressureless, non-contact electrostatic printing apparatus for the transfer of a pre-formed image of dielectric particles to an image-receiving substrate comprising:

a. a thin, flexible image-forming plate adapted to receive the desired image to be printed, said plate being in the form of a rotatably mounted continuous belt capable of being flexed at ultrasonic frequencies;

b. means for applying charged dielectric particles to said thin plate;

c. means for retaining said particles preferentially in the desired image areas of said thin plate;

d. a conductive member positioned in spaced relationship to said thin plate at an image transfer zone;

e. electrical means for establishing an electrostatic field operable between said thin plate and the conductive member;

f. means for positioning the substrate to be printed within the electrostatic field between said thin plate and said conductive member, said substrate facing said thin plate but spaced apart therefrom; and g. piezoelectric crystal means for applying mechanical vibratory shock waves in the ultrasonic range to the portion of said thin plate positioned at said image transfer zone, said piezoelectric crystal means being positioned in one of the belt-supporting rollers serving to position the image-bearing section of said continuous belt in the image transfer zone, the ultrasonic shock waves generated in said roller serving to create ultrasonic flexual waves in said continuous belt so as to impart to said image of particles thereon ultrasonic shock waves of sufficient magnitude to assist said electrostatic field in overcoming the forces tending to cause at least a substantial portion of the particles to adhere to their pre-formed position on the surface of the thin plate, thus facilitating the practical dislodgement of the particles from the thin plate and the subsequent migration thereof to the substrate at the image transfer zone, whereby the particles pre-formed in the desired image configuration may be dislodged from the thin plate, transferred to and reproduced on the spaced-apart substrate in the form desired to be printed thereon at an electrostatic field intensity less than that required for transfer by means of the electrostatic field alone, the uniformity with which said thin plate can be flexed and the relatively close spacing of the nodal pattern of said ultrasonic vibrational shock waves imparted to said thin plate and transmitted to said image of particles serving to enhance the clarity and sharpness of the image transferred to and reproduced on the spaced-apart substrate to be printed.

12. The apparatus of claim 11 in which said thin plate is from about 0.005 to about 0.050 inch in thickness.

13. The apparatus of claim 12 in which said thickness is from about 0.001 to about 0.010 inch.

14. The apparatus of claim 11 in which said piezoelectric crystal means is capable of activation at a driving frequency within the range of from about 20 kHz to about 100 kHz.

15. The apparatus of claim 14 and including means to sweep a driving frequency range including at least one resonance frequency of the vibratory system.

16. The apparatus of claim 11 in which said crystal means comprises at least one piezoelectric disc forming a part of said support roller.

17. The apparatus of claim 11 in which said crystal means comprises at least one piezoelectric tubular crystal forming a part of said support roller.

18. The apparatus of claim 11 in which said thin plate is a thin metallic plate having an insulating image in the form desired to be printed positioned on at least a portion thereof.

19. The apparatus of claim 18 in which said means for applying said particles to the plate and for retaining said particles in the image areas thereof comprises:

a. a charging station at which a corona wire is positioned to impart an electrostatic charge to said plate, the charge being retained in the insulating image areas and being dissipated to ground in the metallic non-image areas thereof, said charging station being positioned along the path of rotation of said continuous belt in advance of the development station; and b. a development station positioned along the path of rotation of said continuous belt subsequent to said charging station but prior to said image-transfer zone.

20. The apparatus of claim 19 and including a cleaning station comprising mechanical means for removing residual particles from said continuous belt, said cleaning station being positioned along the path of rotation of said continuous belt subsequent to said image transfer zone but prior to said charging station.

21. The apparatus of claim 11 in which said crystal means comprises at least two crystals and means for activating said crystals in unison at frequencies in the ultrasonic range.